United States Patent
Marshall et al.

(10) Patent No.: US 9,538,352 B2
(45) Date of Patent: *Jan. 3, 2017

(54) ANCILLARY DATA SUPPORT IN SESSION INITIATION PROTOCOL (SIP) MESSAGING

(71) Applicant: TeleCommunication Systems, Inc., Annapolis, MD (US)

(72) Inventors: Roger S. Marshall, Auburn, WA (US); Yinjun Zhu, Sammamish, WA (US)

(73) Assignee: Telecommunication Systems, Inc., Annapolis, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/834,876

(22) Filed: Aug. 25, 2015

(65) Prior Publication Data

US 2015/0365812 A1    Dec. 17, 2015

Related U.S. Application Data

(63) Continuation of application No. 13/064,653, filed on Apr. 6, 2011, now Pat. No. 9,130,963, which is a continuation of application No. 12/292,921, filed on Dec. 1, 2008, now Pat. No. 7,929,530.

(60) Provisional application No. 60/996,700, filed on Nov. 30, 2007.

(51) Int. Cl.
| | | |
|---|---|---|
| *H04L 12/28* | (2006.01) | |
| *H04W 4/22* | (2009.01) | |
| *H04L 29/06* | (2006.01) | |
| *H04L 29/12* | (2006.01) | |
| *H04L 12/58* | (2006.01) | |
| *H04W 4/12* | (2009.01) | |

(52) U.S. Cl.
CPC ............ *H04W 4/22* (2013.01); *H04L 29/0602* (2013.01); *H04L 29/06176* (2013.01); *H04L 29/06197* (2013.01); *H04L 51/046* (2013.01); *H04L 61/309* (2013.01); *H04L 61/3085* (2013.01); *H04L 65/1006* (2013.01); *H04L 65/1069* (2013.01); *H04W 4/12* (2013.01)

(58) Field of Classification Search
CPC ........... H04L 29/0602; H04L 29/06176; H04L 29/06197; H04L 61/3085; H04L 61/309; H04L 65/1006
See application file for complete search history.

(56) References Cited

U.S. PATENT DOCUMENTS

| | | | | |
|---|---|---|---|---|
| 2004/0125941 | A1* | 7/2004 | Yoakum ................. | G06Q 10/06 379/266.02 |
| 2004/0152469 | A1* | 8/2004 | Yla-Outinen ....... | H04L 65/1006 455/453 |
| 2006/0165060 | A1* | 7/2006 | Dua ....................... | G06Q 20/20 370/352 |

(Continued)

*Primary Examiner* — Le Luu

(74) *Attorney, Agent, or Firm* — Tarolli, Sundheim, Covell & Tummino LLP

(57) ABSTRACT

A SIP ancillary data server provides host to auxiliary data for an emergency SIP session (call) uniquely referred to in a transported SIP header. In a manner similar to how location is represented in an emergency call, a SIP header is extended. The extended SIP Header contains one of two possible types of content elements: either (a) a content pointer element to a SIP Message body part (a "cid:", or content identifier); or (b) an <information_URI> (a.k.a, "info_URI" in this document).

19 Claims, 3 Drawing Sheets

(56) References Cited

U.S. PATENT DOCUMENTS

| | | | |
|---|---|---|---|
| 2007/0206620 A1* | 9/2007 | Cortes | H04L 12/5693 370/412 |
| 2007/0213078 A1* | 9/2007 | Shaheen | H04W 76/002 455/466 |
| 2008/0080525 A1* | 4/2008 | Chatilov | H04L 65/105 370/401 |
| 2008/0151870 A1* | 6/2008 | Stucker | H04M 7/1265 370/352 |
| 2008/0192733 A1* | 8/2008 | Song | H04L 65/1016 370/352 |
| 2008/0267167 A1* | 10/2008 | Apelqvist | H04W 8/22 370/352 |
| 2008/0285544 A1* | 11/2008 | Qiu | H04L 29/12311 370/352 |
| 2009/0125628 A1* | 5/2009 | Dahlen | H04L 67/16 709/227 |
| 2009/0168698 A1* | 7/2009 | Weniger | H04W 8/082 370/328 |
| 2009/0177785 A1* | 7/2009 | Reid | H04L 29/06027 709/228 |
| 2010/0223339 A1* | 9/2010 | Cheng | H04L 65/1036 709/206 |

* cited by examiner

ANCILLARY DATA SUPPORT IN SESSION INITIATION PROTOCOL (SIP) MESSAGING

The present application is a continuation of U.S. application Ser. No. 13/064,653, filed Apr. 6, 2011, entitled "Ancillary Data Support in Session Initiation Protocol (SIP) Messaging"; which claims priority from U.S. application Ser. No. 12/292,921, filed Dec. 1, 2008, entitled "Ancillary Data Support in Session Initiation Protocol (SIP) Messaging", now U.S. Pat. No. 7,929,530; which in turn claims priority from U.S. Provisional Appl. No. 60/996,700, filed Nov. 30, 2008, entitled "Ancillary Data Reference For Session Initiation Protocol (SIP)", to Marshall et al., the entirety of all three of which is are expressly incorporated herein by reference.

BACKGROUND OF THE INVENTION

1. Field of the Invention

This invention relates generally to communications networks. More particularly, it relates to telecommunications networks including Voice Over Internet Protocol (VoIP) network communications, and most particularly to SIP (Session Initiation Protocol) emergency service messaging via IP telecommunications for voice, video, and text.

2. Background of the Related Art

Session Initiation Protocol (SIP) is a basic protocol for initiating interactive communication sessions (e.g., voice, video, chat, interactive games, virtual reality, etc.) between users. In given SIP-based applications, location of a particular wireless device is desired or required.

Currently, location and other caller-related data for the majority of calls (VoIP, cellular, or landline) is delivered or determined through multiple mechanisms. For instance, location and other data for the majority of calls is determined via the use of a unique query key (such as the telephone number or uniform resource identifier (URI)) to perform a database lookup. In these architectures, the unique query key (e.g., telephone number or URI) is used as a lookup element to query provisioned, staged or static information (e.g., from a suitable database) outside of the actual call signaling for location information. An exemplary technique and apparatus to inject a location object into a routing SIP message is disclosed in co-owned U.S. patent application Ser. No. 11/902,845, filed Sep. 26, 2007, the entirety of which is expressly incorporated herein by reference.

FIG. 3 shows a conventional exemplary Voice over Internet Protocol (VoIP) based routing architecture for a given Session Initiation Protocol (SIP) message.

In particular, as shown in FIG. 3, a Session Internet Protocol (SIP) message includes a unique query key, or location key (e.g., telephone number or URI) to be used to determine an action based on the initiator's location (i.e., position). As shown in FIG. 3, the SIP message including the unique query (e.g., location) key is passed to a positioning center 502.

Using the received location key, the positioning center 502 passes a query to an appropriate database 504, e.g., a database associating static location with various location key information. The static location database 504 determines the desired location information relating to the input location key, and returns the static location to the requesting positioning center 502.

Then, having obtained appropriate location information, the positioning center 502 passes a request to another database, e.g., a routing database 506. to obtain routing information associated with the received location information. The routing database 506 outputs appropriate routing information to the requesting positioning center 502. At that point, the positioning center 502 passes on the SIP message together with new routing information obtained from the routing database 506.

Standards development groups have created a mechanism for providing location associated to an endpoint or anchor point within a SIP session ("call"). Moreover, discussions have taken place promoting the idea of providing a limited set of URIs (Uniform Resource Identifiers) with the SIP messaging.

But a mechanism has not been heretofore provided to provide associated "ancillary" data with the call. The present inventors realize that such a mechanism is desired to support emergency calling as a primary application, and could be extended into commercial uses.

Disadvantages of the prior technology includes, e.g., providing a limited set of URIs, is not sufficient to cover all known or eventual types of data that are or will be required. Moreover, by providing URIs only, there is no provision for including (embedding) ancillary data within the SIP body part. Furthermore, body part(s) as a separate package can be easily encrypted while the headers remain in plain text. (Providing one or more URIs as the only option cannot ensure that the data associated with it will be delivered in an encrypted or digitally signed manner, whereas a mechanism for embedding the data within the SIP message itself allows for its encryption and/or digital signature as required.)

SUMMARY OF THE INVENTION

In accordance with the principles of the present invention, a Session Initiation Protocol (SIP) proxy server for facilitating inclusion of auxiliary data along with location in a SIP session comprises a first communication path to receive a SIP message from an initiator of the SIP message. A proxy module associates auxiliary information identified in a SIP header of the SIP message with the received SIP message. A second communication path provides access to a recipient of the SIP message. In this way, aside from the association to the auxiliary information, the SIP message further includes current location information relating to a current position of the initiator.

BRIEF DESCRIPTION OF THE DRAWINGS

Features and advantages of the present invention will become apparent to those skilled in the art from the following description with reference to the drawings which.

DETAILED DESCRIPTION OF ILLUSTRATIVE EMBODIMENTS

The present invention diverges from current NENA standards by providing ancillary data via a finite set of highly constrained universal resource indicators (URIs) (e.g., carrier_name_address@somedomain.com).

The present invention leverages the model already created for associated location in SIP, (e.g., Presence Identity Document Format—Location Object (PIDF-LO)), we specify a new technique, based on an XML/tagged structure, and for the provision of ancillary data associated with a call, aside from location, within the SIP header.

The invention utilizes techniques standardized in the Internet Engineering Task Force (IETF) for transporting location, but that in accordance with the invention, ancillary information, aside from or in addition to location associated with an emergency SIP session (call), is transported in a SIP header.

Figure 1:
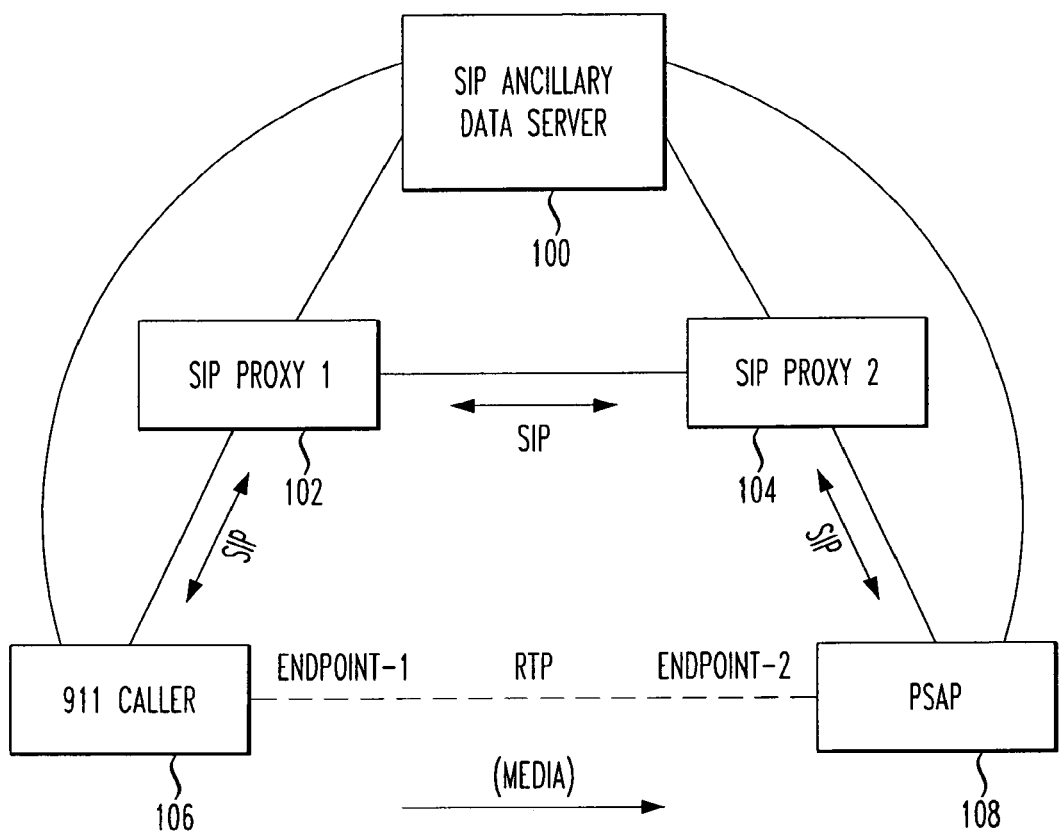
FIG. 1 shows inclusion of a SIP ancillary data server for temporarily hosting auxiliary data for an emergency SIP session (call) uniquely referred to in a transported SIP header, in accordance with the principles of the present invention.

FIG. 1 shows inclusion of a SIP ancillary data server for temporarily hosting auxiliary data for an emergency SIP session (call) uniquely referred to in a transported SIP header, in accordance with the principles of the present invention.

In particular, as shown in FIG. 1, a SIP ancillary data server 100 hosts ancillary data (e.g., a photo of an emergency scene, live streaming video from an emergency scene, a medical history of a patient in need of emergency care, etc.) The hosted data may be live (e.g., streaming video), may be pseudo-live (e.g., a video or photo taken at the emergency scene, uploaded to an appropriate hosting site (the SIP ancillary data server 100), or may be static (e.g., a medical history). Moreover, the hosted data may or may not be retained within a common platform, i.e., within a single SIP ancillary data server 100.

In the given example of an emergency SIP session (call), an emergency caller 106 establishes a SIP session with an emergency services center functioning as a first SIP proxy 102. Using techniques outside of the present invention, an appropriate public service access point (PSAP) 108 is determined based on a location of the emergency caller 106. The emergency caller 106 then establishes a SIP session (call) with the appropriate PSAP 108 via respective SIP proxies 102, 104.

Figure 2:
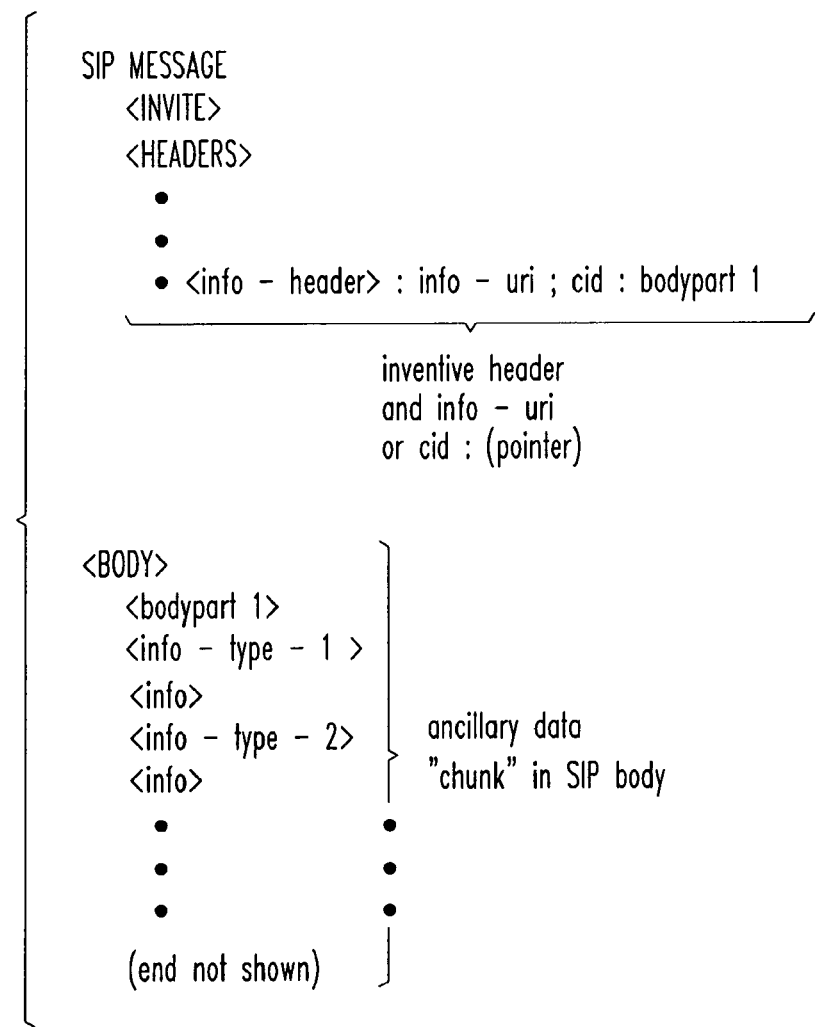
FIG. 2 shows an exemplary SIP message format, in accordance with the principles of the present invention.
Figure 3:
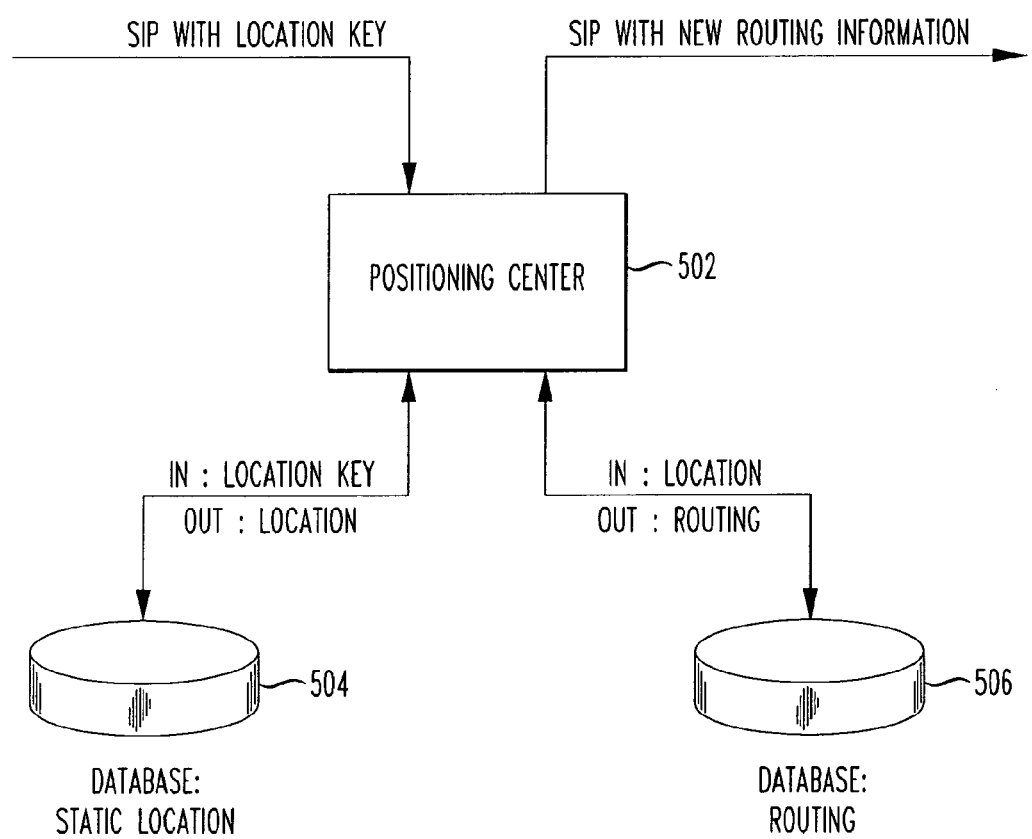
FIG. 3 shows a conventional exemplary Voice over Internet Protocol (VoIP) based routing architecture.

FIG. 2 shows an exemplary SIP message format, in accordance with the principles of the present invention.

In particular, as shown in FIG. 2, in accordance with the principles of the present invention, in a manner similar to how location is represented in an emergency call, a SIP header is extended. The extended SIP Header contains one of two possible types of content elements: either (a) a content pointer element to a SIP Message body part (a "cid:", or content identifier); or (b) an <information_URI> (a.k.a, "info_URI" in this document).

The content pointer (cid:) element makes reference to a structured XML form contained within the SIP message body.

The content <information_URI> (info_URI) makes reference to an external service (e.g., to the SIP ancillary data server 100 shown in FIG. 1) which contains ancillary information. Alternatively, the info_URI may provide a level of redirection to the information (e.g., a universal resource identifier (URI)).

The ancillary information, whether embedded locally in the SIP message, or provided (via request or response to a request) based on the info_URI, is preferably structured as XML/tagged data. The ancillary information is referred to herein collectively as an information object (IO).

The information object (IO) document structure preferably includes one or more sections representing any of many types of ancillary information.

The information object (IO) document is preferably arranged sequentially by Information Type, (e.g., Medical data, Measurement data, Statistics, Profile information, or Multimedia-related information), Preferably, the information object (IO) is infinitely extensible to contain any number of information data types.

The (IO) information object may contain actual data, or one or more reference URIs pointing to some data service, or any combination of both. For instance, as shown in FIG. 1, the IO information object may point to ancillary data temporarily hosted in a SIP ancillary data server 100.

The invention permits ancillary data of any kind to be linked to an emergency SIP call. Moreover, any of the varying types of ancillary data can be registered as standard data types (e.g., IANA Registry).

While shown and described with reference to an emergency SIP call, the principles of the present invention are extensible to any SIP session, including non-emergency cases.

The information within the SIP body can be encrypted and/or digitally signed as required.

Potential current markets for the invention include, for example, Voice over Internet Provider (VoIP) service providers, emergency service providers, or information service providers.

Those that may make particular use of the invention include any/all communications users, including VoIP, wireless and/or landline users, as well as VoIP service providers.

While the invention has been described with reference to the exemplary embodiments thereof, those skilled in the art will be able to make various modifications to the described embodiments of the invention without departing from the true spirit and scope of the invention.

What is claimed is:

1. A method of including ancillary information in a Session Initiation Protocol (SIP) session, comprising:
   intercepting, at a physical SIP proxy server, a SIP message from an initiator device addressed to a recipient device;
   extending a header of said received SIP message to include current location information of said initiator device;
   further extending said header of said received SIP message to include a content pointer referencing an external source device containing ancillary information associated with said received SIP message; and
   routing said SIP message with said extended header on to said recipient device.

2. The method of including ancillary information in a Session Initiation Protocol (SIP) session according to claim 1, wherein:
   said SIP message is an emergency text message.

3. The method of including ancillary information in a Session Initiation Protocol (SIP) session according to claim 1, wherein:
   said recipient device is a public safety answering point (PSAP).

4. The method of including ancillary information in a Session Initiation Protocol (SIP) session according to claim 1, wherein:
   said ancillary information referenced at said external source device is a photo.

5. The method of including ancillary information in a Session Initiation Protocol (SIP) session according to claim 1, wherein:
   said ancillary information referenced at said external source device is live streaming video.

6. The method of including ancillary information in a Session Initiation Protocol (SIP) session according to claim 1, wherein:
   said ancillary information referenced at said external source device is a hosted media file.

7. The method of including ancillary information in a Session Initiation Protocol (SIP) session according to claim 1, wherein:

said ancillary information referenced at said external source device is a medical history file.

8. The method of including ancillary information in a Session Initiation Protocol (SIP) session according to claim 1, wherein:
said received SIP message corresponds to an emergency Voice over Internet Protocol (IP) call.

9. The method of including ancillary information in a Session Initiation Protocol (SIP) session according to claim 1, wherein:
said initiator device of said SIP message is a wireless phone.

10. A method of including ancillary information in a Session Initiation Protocol (SIP) session, comprising:
intercepting, at a physical SIP proxy server, a SIP message from an initiator device addressed to a recipient device;
extending a header of said received SIP message to include current location information of said initiator device;
further extending said header of said received SIP message to include a universal resource indicator (URL) referencing an external source device containing ancillary information associated with said received SIP message; and
routing said SIP message with said extended header on to said recipient device.

11. A method of including ancillary information in a Session Initiation Protocol (SIP) session according to claim 10, comprising:
a form of said uniform resource identifier is <information_URI>.

12. The method of including ancillary information in a Session Initiation Protocol (SIP) session according to claim 10, wherein:
said SIP message is an emergency text message.

13. The method of including ancillary information in a Session Initiation Protocol (SIP) session according to claim 10, wherein:
said recipient device is a public safety answering point (PSAP).

14. The method of including ancillary information in a Session Initiation Protocol (SIP) session according to claim 10, wherein:
said ancillary information referenced at said external source device is a photo.

15. The method of including ancillary information in a Session Initiation Protocol (SIP) session according to claim 10, wherein:
said ancillary information referenced at said external source device is live streaming video.

16. The method of including ancillary information in a Session Initiation Protocol (SIP) session according to claim 10, wherein:
said ancillary information referenced at said external source device is a hosted media file.

17. The method of including ancillary information in a Session Initiation Protocol (SIP) session according to claim 10, wherein:
said ancillary information referenced at said external source device is a medical history file.

18. The method of including ancillary information in a Session Initiation Protocol (SIP) session according to claim 10, wherein:
said received SIP message corresponds to an emergency Voice over Internet Protocol (IP) call.

19. The method of including ancillary information in a Session Initiation Protocol (SIP) session according to claim 10, wherein:
said initiator device of said SIP message is a wireless phone.

* * * * *